United States Patent [19]
Bastetti et al.

[11] Patent Number: 4,882,191
[45] Date of Patent: Nov. 21, 1989

[54] METHOD OF MAKING LONG-TERM PRESERVATION COOKED PASTA PRODUCTS READY FOR CONSUMPTION

[75] Inventors: Giuseppe Bastetti; Sergio Veronesi, both of Milan, Italy

[73] Assignee: Barilla G.E R. F.LLI - Societa per Azioni, Parma, Italy

[21] Appl. No.: 137,702

[22] Filed: Dec. 24, 1987

[30] Foreign Application Priority Data

Sep. 25, 1987 [IT] Italy .............................. 22042 A/87

[51] Int. Cl.[4] .............................................. A23L 1/16
[52] U.S. Cl. .................................... 426/557; 426/511; 426/451
[58] Field of Search ............... 426/557, 510, 511, 451, 426/106, 392

[56] References Cited

U.S. PATENT DOCUMENTS 4,539,214  9/1985  Winter et al. ....................... 426/557

FOREIGN PATENT DOCUMENTS 53-37423  10/1978  Japan ................................. 426/557
59-213375  12/1984  Japan ................................. 426/557

Primary Examiner—George Yeung
Attorney, Agent, or Firm—Sughure, Mion, Zinn, Macpeak & Seas

[57] ABSTRACT

In a sterile environment, metered amounts of a pasta product are sterilized by means of steam, cooked in salted water, freed of all the cooking water, and finally packaged within sealed containers. The end product is a dish of long-term preservation cooked pasta for direct consumption, it having organoleptic properties quite comparable with those of a freshly prepared dish of pasta.

8 Claims, No Drawings

METHOD OF MAKING LONG-TERM PRESERVATION COOKED PASTA PRODUCTS READY FOR CONSUMPTION

DESCRIPTION

This invention relates to a method of making long-term preservation cooked pasta products ready for consumption, on an industrial scale.

More particularly, the invention is concerned with a method as specified above for producing pasta-based dishes ready for consumption and individually packaged within sealed containers.

As a rule, in the production of long-term preservation cooked food dishes for direct consumption a twofold requirement must be met, namely non-toxicity and long-term preservability of the product must be ensured, while, on the other hand, the physical and organoleptic properties of the cooked food product is to come as close as possible to those of a similar, freshly prepared dish.

In the specific instance of pasta-based dishes, additionally to preservation of the organoleptic properties (color, taste, texture and feel on mastication), preservation of the food nutritive power is also of significant importance.

Of these requirements, ensuring non-toxicity and preservability over time is the recognized factor of paramount importance.

To this aim, the background art has proposed, and consistently resorts to heat sterilization of the cooked pasta, as previously additivated with some selected seasoning and in the packaged condition, using excess free water in respective sealed containers.

Sterilization is carried out at temperatures on the order of 120° C. over periods of about 60-90 minutes, the provision of excess free water being necessary to a good transfer of heat and to thereby ensure, on the one side, that the packaged pasta product can be thoroughly sterilized, and on the other side, a shortened sterilization time.

It is to the very presence of this excess water that originates the greatest and best-recognized drawbacks of prior techniques for making long-term preservation pasta-based dishes for direct consumption.

In fact, in the aforesaid packages, cooked pasta is left in contact with said excess water during a storage period which may be long, so that the pasta is, by the time it is consumed, overwatered, and even soaked within a watery liquid through which the condiment is dispersed. Such pasta products have no resistance on mastication, while the organoleptic properties of the pasta and the condiment added to it invariably undergo undesired deterioration.

Further, prolonged and intensive heating in the presence of excess water, as applied to pre-cooked pasta in order to have it sterilized, is definitely harmful to the pasta consistency on chewing it, and it is even possible for the pasta to become mushy as a result of its structural (gluten/starch) support collapsing.

For these reasons, a current trend in the art is primarily directed to the use of packages formed from thin sheets of a suitable plastics material, in order to achieve faster heating of the package core and, accordingly, reduce the sterilization time.

The problem underlying this invention is to provide a method of making, on an industrial scale, cooked pasta-based dishes for long-term preservation and direct consumption which, while obviating the drawbacks of the background art, reliably affords, additionally to non-toxicity of the packaged product, retention of all the organoleptic properties and properties of resistance on mastication as if freshly prepared.

This problem is solved according to the invention by a method as indicated being characterized in that it comprises the following steps, to be all carried out in a sterile environment:

sterilization by means of substantially dry steam of a pasta product having a moisture content within the range of 20% to 30%;

cooking the thus sterilized pasta product in a suitable amount of cooking water;

removing all of the cooking water from the pasta product thus sterilized and cooked; and packaging metered amounts of said sterilized and cooked pasta product inside sealed containers.

Preferably, and prior to its packaging, the cooked pasta product, from which the cooking water has been removed, is cooled down to a temperature in the 30° C. to 70° C. range.

Advantageously and in accordance with an aspect of this invention, the sterilized pasta product is cooked at a temperature of about 120° C. for a time period varying from two to six minutes, depending on the size of said pasta product, the cooking water including approximately 1% salt.

The product yielded by the method of this invention is a dish of cooked and sterilized pasta packaged in a sealed container, wherein the pasta only contains water in the amount required for its structure. Such a product has shown long-term preservability, and upon consumption, high organoleptic properties and properties of resistance on mastication quite comparable with those of a freshly prepared dish of pasta, combined with the requisite non-toxic properties.

According to a further aspect of this invention, prior to its packaging in sealed containers, the pasta product, as sterilized, cooked, and freed of all the cooking water, is additivated with a set amount of a sterilized condiment.

Alternatively, said amount of sterilized condiment can be packaged separately within the same sealed container which contains the sterilized and cooked pasta product.

The features and advantages of this invention will be more clearly understood by making reference to the following exemplary embodiments of the inventive method, given herein by way of illustration and not of limitation.

EXAMPLE 1

An environment maintained in a sterile condition has been successively supplied with metered amounts including 80 g freshly prepared spaghetti with 30% moisture content. The metered amounts of spaghetti were loaded on respective small trays formed from aluminum foil. In the sterile environment, each spaghetti tray was subjected to treatment with dry steam at 121° C. for a 15 minutes period and thoroughly sterilized. On completion of this treatment, the moisture content of the sterilized spaghetti was still 30%.

Thereafter, each tray was dipped in salted water at 1% salt, at a temperature of 121° C. for a sufficiently long time period for said spaghetti to be cooked. The cooking times varied from 2 to 4 minutes according to the size and composition of the spaghetti. On completion of the cooking step, the cooking water was carried completely away from the spaghetti either by draining or suction. After the amounts of spaghetti were cooled to a temperature in the 30° C. to 70° C. range, the trays and their sterilized and cooked spaghetti contents were sealed within respective containers, and finally, each sealed package was removed from the sterile environment. The packages included no free water, the amount of water trapped in the cooked pasta being that strictly required for its structure.

The product yielded in this Example remained sterile for at least 12 months, and at the end of this period, the spaghetti, when heated for consumption, showed to be as tough to chew and have the same organoleptic properties as freshly cooked spaghetti.

EXAMPLE 2

The procedure followed in Example 1 is repeated with the exception that prior to sealing the package, the sterilized cooked amounts of spaghetti, as freed of all the cooking water and cooled to 30° C., were additivated with 60 g of a sterilized condiment known by the name of Genoese sauce.

This condiment had the following composition by weight: 62.3 parts olive oil, 15 parts basil, 15 parts pine nuts, 4 parts parsley, 3 parts salt, 0.5 parts garlic, and 0.2 parts sugar.

After adding the sterilized condiment, the amounts of spaghetti were packaged in the sealed container and the package removed from the sterile environment.

Also in this case, the resulting products (spaghetti with Genoese sauce) were found still sterile after a 12 months period, and on consumption, they showed organoleptic properties and a resistance on mastication quite comparable with those of freshly cooked Genoese sauce spaghetti.

EXAMPLE 3

In an environment maintained in a strictly sterile condition, there have been introduced successively metered amounts of 70 g re-moistened noodles having a moisture content of 21%. The noodles were contained in small trays formed from crystalline PET. In the sterile environment, each tray with the noodles therein was subjected to a dry steam treatment at 121° C. for 15 minutes until thoroughly sterilized. During this step, the noodles revealed no absorption of additional moisture. Subsequently, each tray was dipped into salted water at 1% salt maintained at a temperature of 121° C. for a 2 minutes period, as required to cook the noodles. On completion of the cooking operation, the cooking water was taken completely away from the trays, either by a draining or a suction process. After cooling to a temperature of 30° C, the sterilized cooked noodles were sealed in respective packages and finally removed from the sterile environment. The packages had no free water therein, and the amount of water taken up by the cooked pasta product was as strictly indispensable for its structure.

The resulting product of this Example was found still thoroughly sterile after 12 months storage, and on consumption, showed organoleptic properties and a resistance on mastication quite comparable with those of freshly cooked noodles.

EXAMPLE 4

The same procedure as in Example 3 was followed with the difference that, prior to packaging in sealed containers, the noodles in each tray, as cooked, sterilized and freed of cooking water, and cooled to 30° C., were additivated with 50 g sterilized meat gravy having the following composition: 44 parts meat bouillon, 21.5 parts beef, 16 parts tomato flesh, 10 parts vegetables, 5 parts tomato concentrate, 3 parts olive oil, and 0.5 parts salt, where all the parts are parts by weight.

After additivation, the trays were packaged and sealed, and finally removed from the sterile environment.

EXAMPLE 5

An environment maintained in a sterile condition has been supplied in succession with metered amounts of 70 g short cut pasta, as re-moistened to a moisture content of 21%. These metered amounts of short cut pasta, known by the name of "penne", were contained in small trays formed from aluminum foil. In said sterile environment, each tray was subjected to a sterilization treatment with dry steam at 121° C for 15 minutes. At the end of this treatment, the pasta revealed no increase of its moisture content.

Subsequently, each tray was dipped into 300 ml water at 1% salt and maintained at 121° C., the immersion lasting 5 minutes to have the "penne" cooked to a desired extent.

At the end of the cooking step, all of the cooking water was removed from the trays, and the trays were packaged in sealed containers after cooling to 30° C. In the packages, free water is completely absent, and the amount of water taken up in the cooked pasta is that strictly necessary for its structure.

The product yielded by this embodiment of the inventive method was still sterile after a 12-month storage period, and on consumption, the "penne" pasta product showed organoleptic properties and a resistance on mastication quite comparable with those of freshly cooked "penne" pasta products.

EXAMPLE 6

The procedure followed in Example 5 was repeated, excepting that prior to seal packaging, beside the sterilized cooked "penne" pasta, as cooled to 70° C, but separately therefrom, each tray was loaded with a metered amount of a sterilized condiment; the trays were finally placed into respective sealed packages. The products yielded by the process were still sterile after 12-month storage, and on consumption, following heat application and mixing of the heated "penne" pasta with the condiment, showed organoleptic properties and a resistance on mastication quite comparable with those of seasoned "penne" pasta freshly prepared.

I claim:

1. A method of making long-term preservation cooked pasta products ready for consumption, comprises the following steps, to be all carried out in a sterile environment:

sterilizing a pasta product having a moisture content within the range of 20% to 30% by means of substantially dry steam;

cooking the thus sterilized pasta product in a suitable amount of cooking water;

removing all of the cooking water from the pasta product thus sterilized and cooked; and packaging metered amounts of said sterilized and cooked pasta product inside sealed containers.

2. A method according to claim 1, wherein prior to the sterilized and cooked pasta product packaging step, said pasta product is cooled down to a temperature in the 30° C. to 70° C. range.

3. A method according to claim 1, wherein sterilizing step is carried out at a temperature of about 120° C. for time periods in the 12 to 18 minutes range.

4. A method according to claim 1, wherein said sterilized pasta product cooking step is carried out at temperature of about 120° C. for time periods in the 2 to 6 minutes range.

5. A method according to claim 4, wherein cooking water includes an amount of salt.

6. A method according to claim 1, wherein prior to packaging inside sealed containers, a metered amount of cooked pasta product, as sterilized and freed of all the cooking water, is additivated with a metered amount of a selected condiment or sauce.

7. A method of making long-term preservation cooked pasta products ready for consumption, it comprises the following steps of:
supplying successively into a sterile environment metered amounts of a pasta product having a moisture content of 20–30%;
sterilizing in said environment said metered amounts of pasta product by means of substantially dry steam at a temperature on the order of 120° C. for time periods in the 12 to 18 minutes range;
cooking in said environment the thus sterilized pasta product in cooking water at a temperature on the order of 120° C. for time periods in the 2 to 6 minutes range;
removing from the thus sterilized and cooked pasta product all of the cooking water; and
cooling and packaging the metered amounts of pasta product, as sterilized, cooked, and freed of the cooking water, inside respective sterilized containers.

8. A method making long-term preservation cooked pasta products ready for consumption, comprises the following steps, to be all carried out in a sterile environment:
remoisturizing a pasta product to a moisture content within the range of 20 to 30%;
sterilizing said pasta product by means of substantially dry steam;
cooking the thus sterilized pasta product in a suitable amount of cooking water;
removing all of the cooking water from the pasta product thus sterilized and cooked; and
packaging metered amounts of said sterilized and cooked pasta product inside sealed containers.

* * * * *